United States Patent
Bunting et al.

(10) Patent No.: US 10,119,635 B2
(45) Date of Patent: Nov. 6, 2018

(54) LOCKING FLUID FITTINGS

(71) Applicant: UNITED TECHNOLOGIES CORPORATION, Hartford, CT (US)

(72) Inventors: Billie W. Bunting, Colchester, CT (US); Robert J. DeRosa, Tolland, CT (US); Craig Michael Callaghan, East Granby, CT (US); Mark W. Colebrook, Glastonbury, CT (US); Ranganath Santosh, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 897 days.

(21) Appl. No.: 14/200,649

(22) Filed: Mar. 7, 2014

(65) Prior Publication Data

US 2014/0312611 A1    Oct. 23, 2014

Related U.S. Application Data

(60) Provisional application No. 61/774,771, filed on Mar. 8, 2013.

(51) Int. Cl.
*F02C 7/22* (2006.01)
*F16L 15/00* (2006.01)

(52) U.S. Cl.
CPC ............ *F16L 15/006* (2013.01); *F02C 7/222* (2013.01); *F16L 15/00* (2013.01); *Y10T 29/49895* (2015.01)

(58) Field of Classification Search
CPC ......... F16L 15/006; F16L 15/00; F02C 7/222; Y10T 29/49895

USPC ............................................................ 285/92
See application file for complete search history.

(56) References Cited

U.S. PATENT DOCUMENTS

| 2,842,180 | A | | 7/1958 | Brown et al. | |
|---|---|---|---|---|---|
| 3,011,552 | A | * | 12/1961 | Rhodes | E21B 33/047 166/67 |
| 3,429,351 | A | * | 2/1969 | Szalanczy | F16B 13/0825 411/259 |
| 3,842,914 | A | * | 10/1974 | Mott | E21B 17/06 166/377 |
| 4,346,920 | A | * | 8/1982 | Dailey | F16L 15/001 175/297 |
| 4,790,572 | A | * | 12/1988 | Slyker | E21B 33/043 166/182 |
| 5,028,191 | A | * | 7/1991 | Rowley | F16B 39/34 411/292 |
| 5,188,398 | A | | 2/1993 | Parimore, Jr. et al. | |

(Continued)

*Primary Examiner* — Brent W Herring
(74) *Attorney, Agent, or Firm* — Carlson, Gaskey & Olds, P.C.

(57) ABSTRACT

A fluid conduit for a gas turbine engine includes a first fluid conduit attachable to a second fluid conduit and securable together with a lockable connector. The connector includes a first portion including external threads and a second portion receiving the first portion and including internal threads mating to the external threads of the first portion. The internal threads include lead threads defining a first thread interface with the external threads for starting attachment of the first portion to the second portion and locking threads defining a second thread interface for locking the first portion to the second portion.

19 Claims, 3 Drawing Sheets

(56) References Cited

U.S. PATENT DOCUMENTS

| | | | |
|---|---|---|---|
| 5,350,200 A * | 9/1994 | Peterson | F16L 19/005 285/330 |
| 5,415,442 A * | 5/1995 | Klementich | F16L 15/004 285/331 |
| 5,462,315 A * | 10/1995 | Klementich | F16L 15/004 285/24 |
| 5,800,435 A * | 9/1998 | Errico | A61B 17/7007 606/261 |
| 5,823,264 A * | 10/1998 | Ringgenberg | E21B 17/07 166/355 |
| 5,851,035 A | 12/1998 | Marc et al. | |
| 5,927,762 A * | 7/1999 | Webb | F16L 39/005 285/123.15 |
| 6,050,609 A | 4/2000 | Boscaljon et al. | |
| 6,385,837 B1 * | 5/2002 | Murakami | B23P 19/066 285/333 |
| 6,902,205 B2 * | 6/2005 | Bouey | F16L 33/224 285/243 |
| 6,988,748 B2 | 1/2006 | Staniszewski et al. | |
| 7,222,889 B2 | 5/2007 | Breay | |
| 7,384,075 B2 * | 6/2008 | Ress, Jr. | F01D 11/00 285/333 |
| 7,571,937 B2 | 8/2009 | Patel | |
| 8,360,478 B2 * | 1/2013 | Hurwitz | F16D 1/072 285/222.4 |
| 2005/0099004 A1 * | 5/2005 | Bouey | F16L 33/224 285/249 |
| 2005/0253379 A1 * | 11/2005 | Ress, Jr. | F01D 11/00 285/92 |
| 2007/0164566 A1 | 7/2007 | Patel | |
| 2011/0210543 A1 * | 9/2011 | German | F16L 21/007 285/330 |
| 2011/0215567 A1 * | 9/2011 | Hurwitz | F16D 1/072 285/256 |
| 2012/0273233 A1 * | 11/2012 | Drenth | E21B 17/042 166/380 |
| 2013/0220636 A1 * | 8/2013 | Drenth | E21B 17/042 166/380 |

\* cited by examiner

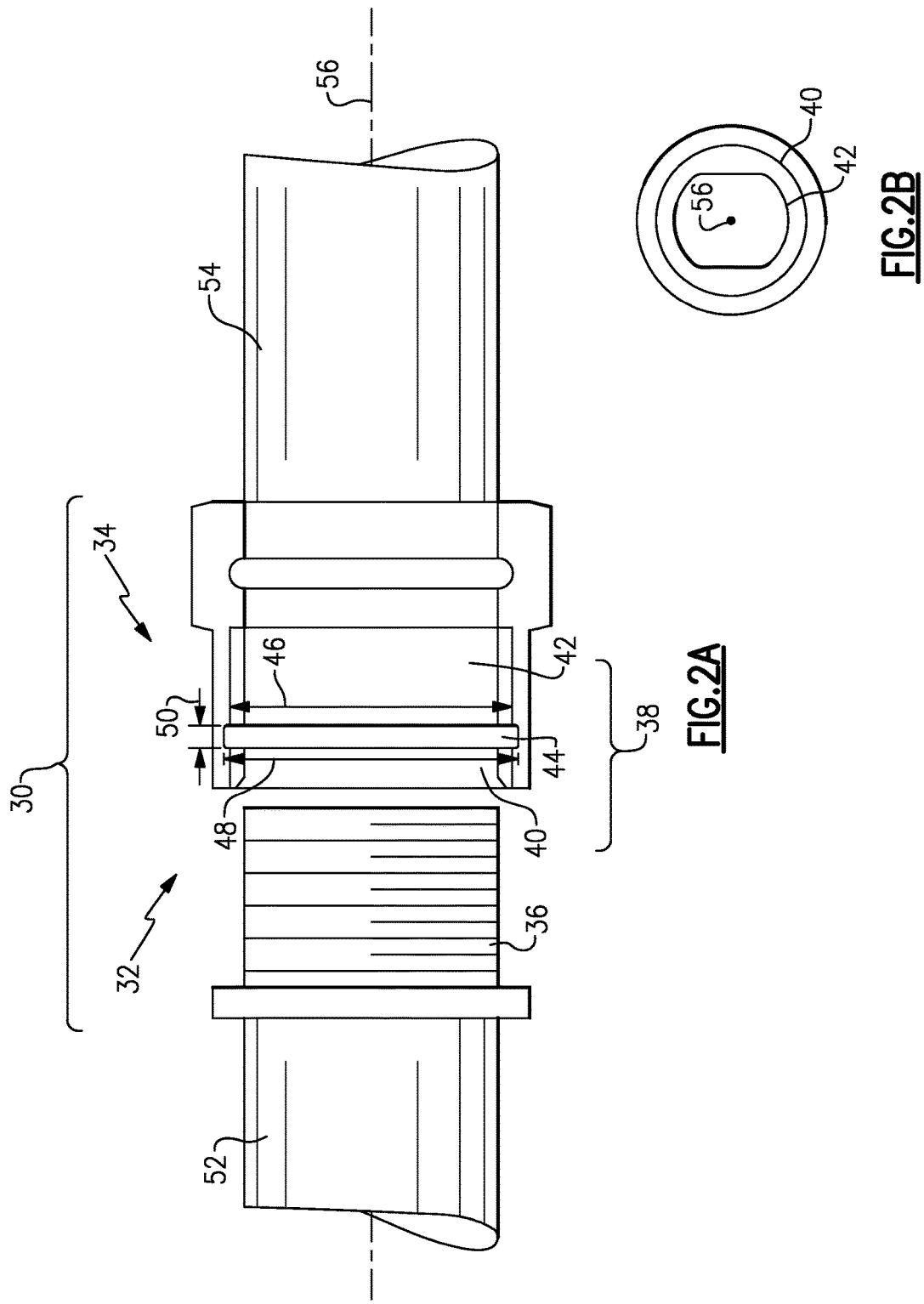

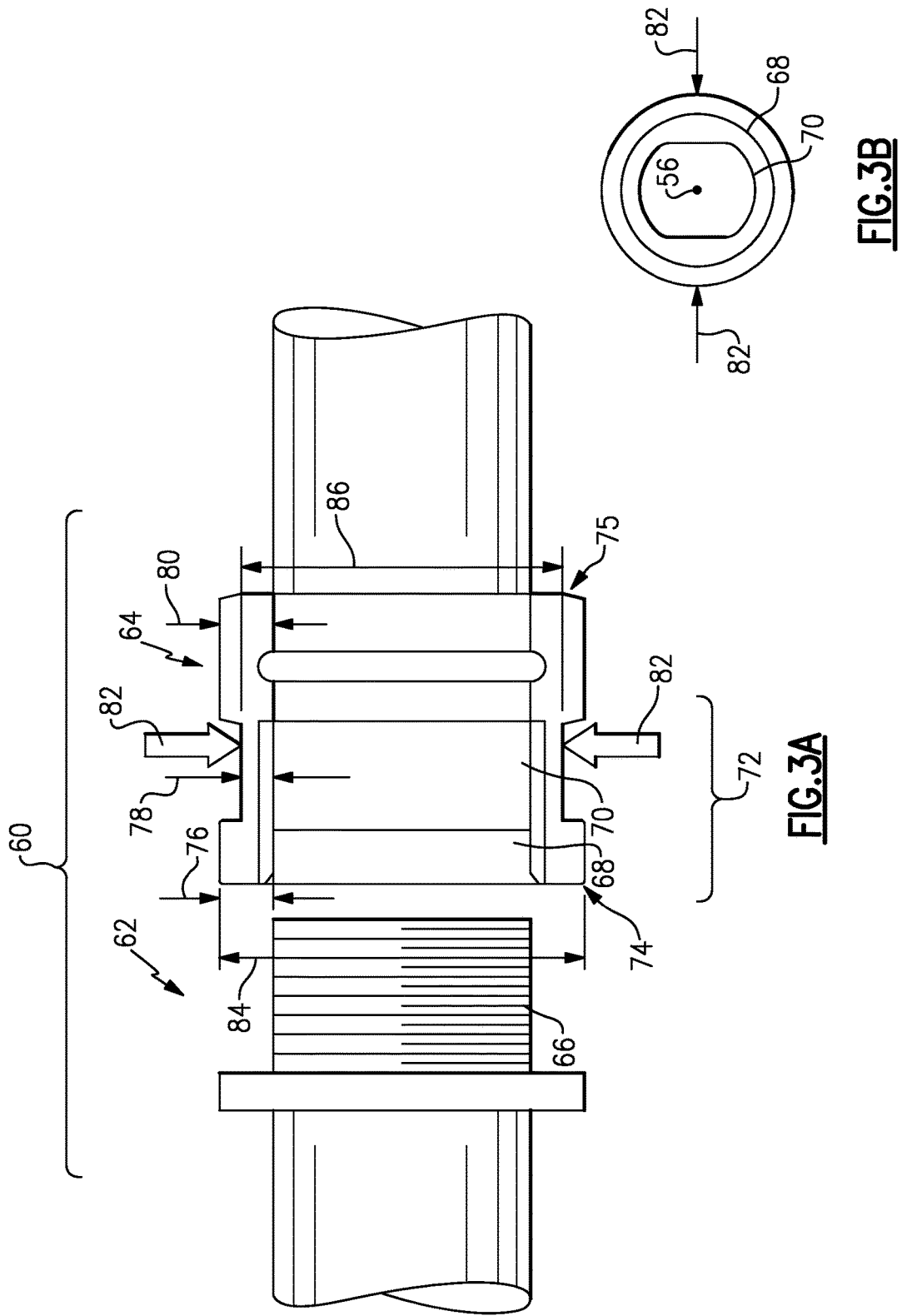

LOCKING FLUID FITTINGS

CROSS REFERENCE TO RELATED APPLICATION

This application claims priority to U.S. Provisional Application No. 61/774,771 filed Mar. 8, 2013.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

Fluid conduits and tubing are routed throughout the gas turbine engine to deliver fuel, lubricant, hydraulic fluid, and other fluids where needed. Each conduit is terminated or connected by way of connectors that extend through support structures as well as specific sections. Each of the connectors requires a locking system to maintain the connection. Locking wires are sometimes utilized to lock a connector in place. However, locking wires have disadvantages and may not be utilized in some locations within the gas turbine engine.

Accordingly, it is desirable to design and develop connectors that provide locking features without the use of a locking wire.

SUMMARY

A fluid connection fitting according to an exemplary embodiment of this disclosure, among other possible things includes a first portion including external threads, and a second portion receiving the first portion and including internal threads for mating to the external threads. The internal threads include lead threads defining a first thread interface with the external threads for starting attachment of the first portion to the second portion and locking threads defining a second thread interface for locking the first portion to the second portion.

In a further embodiment of the foregoing fluid connection, the locking threads are non-concentric about a central axis of the second portion and the lead threads are concentric about the central axis.

In a further embodiment of any of the foregoing fluid connection fittings, the connector includes a first thickness disposed at the lead threads and a second thickness disposed at the locking threads, with the second thickness less than the first thickness for providing for deformation of an outer diameter proximate to the locking threads.

In a further embodiment of any of the foregoing fluid connection fittings, the first thickness corresponds with a first diameter and the second thickness corresponds with a second diameter less than the first diameter.

In a further embodiment of any of the foregoing fluid connection fittings, includes a relief disposed between the lead threads and the locking threads. The relief does not include threads.

In a further embodiment of any of the foregoing fluid connection fittings, the locking threads define an interference fit with the external threads of the first portion.

In a further embodiment of any of the foregoing fluid connection fittings, the lead threads and the locking threads include a first inner diameter and the relief includes a second inner diameter greater than the first diameter.

In a further embodiment of any of the foregoing fluid connection fittings, the relief includes an axial length greater than at least two of the lead threads.

A fluid conduit for a gas turbine engine according to an exemplary embodiment of this disclosure, among other possible things includes a first fluid conduit attachable to a second fluid conduit along an axis, and a connector for securing the first fluid conduit to the second fluid conduit. The connector includes a first portion including external threads. A second portion receives the first portion and includes internal threads for mating to the external threads. The internal threads include lead threads defining a first thread interface with the external threads for starting attachment of the first portion to the second portion and locking threads defining a second thread interface for locking the first portion to the second portion.

In a further embodiment of the foregoing fluid conduit, the locking threads are non-concentric about a central axis of the second portion and the lead threads are concentric about the central axis.

In a further embodiment of any of the foregoing fluid conduit fittings, the connector includes a first thickness disposed at the lead threads and a second thickness disposed at the locking threads, with the second thickness less than the first thickness for providing for deformation of an outer diameter proximate to the locking threads.

In a further embodiment of any of the foregoing fluid conduit fittings, the first thickness corresponds with a first diameter and the second thickness corresponds with a second diameter less than the first diameter.

In a further embodiment of any of the foregoing fluid conduit fittings, includes a relief disposed between the lead threads and the locking threads. The relief does not include threads.

In a further embodiment of any of the foregoing fluid conduit fittings, the locking threads define an interference fit with the external threads of the first portion.

In a further embodiment of any of the foregoing fluid conduit fittings, the lead threads and the locking threads include a first inner diameter and the relief includes a second inner diameter greater than the first diameter.

A method of locking a fluid fitting according to an exemplary embodiment of this disclosure, among other possible things includes defining a first coupling portion including external threads, defining a second coupling portion receiving the first portion and including internal threads for mating to the external threads, the internal threads include lead threads defining a first thread interface with the external threads for starting attachment of the first portion to the second portion and locking threads defining a second thread interface for locking the first portion to the second portion, aligning the first coupling portion with the second coupling portion by engaging the externals threads the lead in threads, and locking the first coupling portion to the second coupling portion by engaging the external threads with the locking threads of the second coupling portion.

In a further embodiment of the foregoing method, includes generating a locking fit by deforming the locking threads to be non-concentric about a central axis of the second portion and maintaining the lead threads as concentric about the central axis.

In a further embodiment of any of the foregoing methods, includes generating a locking fit by providing the locking threads with an interference fit relative to the external threads.

In a further embodiment of any of the foregoing methods, includes providing a relief disposed between the lead threads and the locking threads with the relief not including threads.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

FIG. 2A is a cross-section of an example fluid connection fitting.

FIG. 2B is a sectional view of the example fluid connection fitting.

FIG. 3A is cross-section of another example fluid connection fitting.

FIG. 3B is a cross-section of the example connection fitting shown of FIG. 3A.

DETAILED DESCRIPTION

Figure 1:
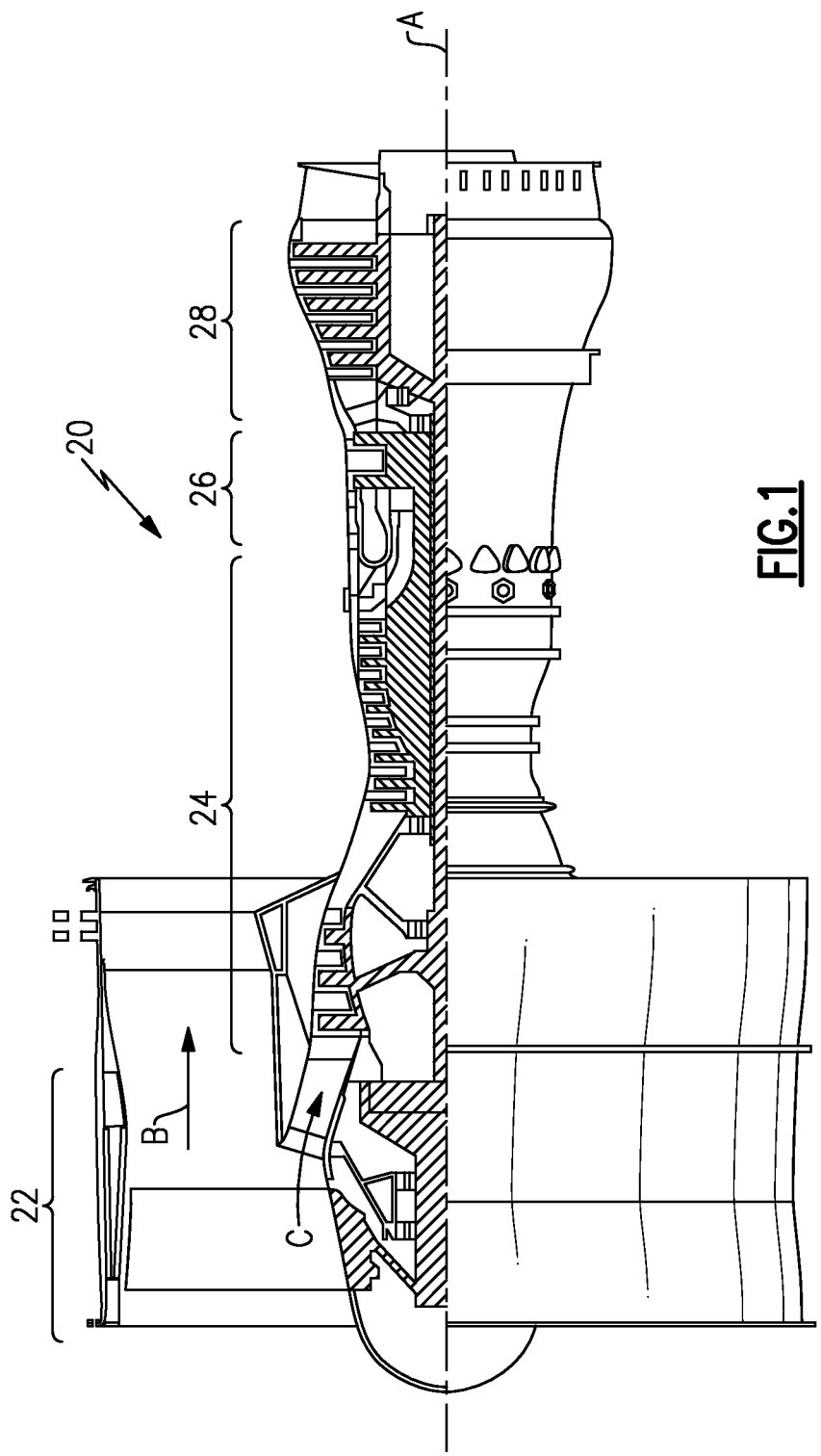
FIG. 1 is a schematic view of an example gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

The example gas turbine engine 20 includes many couplings and fittings for routing fluid to various components. Each of the fluid connection fittings are required to be coupled in a manner that it prevents leakage and assures that the fittings remain connected during engine operation. Many of the fluid couplings are required to have a locking system, such as for critical lubrication, fuel, and air fittings. Previous locking fittings utilized a lock wire along with other additional devices to maintain the desired fluid coupling during operation.

In some applications, it is desired to provide a fluid connection fitting that provides locking without the use of external devices such as locking wire. In such devices, it is required that the fluid coupling maintains integrity and maintains connection throughout engine operation.

Referring to FIGS. 2A and 2B, an example fluid connection assembly 30 includes a first connector portion 32 that is coupled to a second connection portion 34 along a connector axis 56. The first connector portion 32 includes external threads 36 that are received within the second connector portion 34. The second connector portion 34 comprises a nut that threads onto the external threads 36 of the first connector portion 32. A first fluid conduit 52 is attached and corresponds with the first connector portion 32. A second fluid conduit 54 corresponds and is attached to the second connector portion 34.

The second connector portion 34 includes first threads 40 and second threads 42 that comprise a thread assembly 38. The example thread assembly 38 is separated by a relief portion 44. The relief portion 44 does not include threads and is of a width that is equal to at least two or three of the example threads provided in the threads 40 and 42.

The first threads 40 comprises a plurality of threads that provide a normal standard fit with the external threads 36. The second set of threads 42 that are separated by the relief 44 from the standard threads 40 comprises an interference fit. The interference fit of the threads 42 provides for the locking of the first connector portion 32 into the second connector portion 34.

The first threads 40 allow for hand tightening of the first connector portion 32 to the second connector portion 34. Once the first connector portion 32 is threadingly engaged to the second connector portion 34, a tool can be utilized to further fasten the threads 36 into the interference threads provided in the second threads 42.

The relief 44 includes a diameter 48 that is larger than the diameter 46 of the threaded portions 38. The relief 44 eliminates potential mismatch between the standard threads provided in the first threads 40 and the interference threads provided in the second portion 32.

The threaded assembly 38 is formed by first forming the interference threads from the end of the second connector portion 34 through to the second threads 42. The relief 44 is then formed by a machine cutting tool or other known machining method and standard threads are rethreaded in the first threads 40 to allow for hand threading during assembly.

Accordingly, once the first portion 32 is fully engaged with the interference threads 42, the first connector portion 32 is locked to the second portion 34 such that the connection is maintained and provides the desired locking between connector portions 32, 34.

Referring to FIGS. 3A and 3B, a second connector assembly 60 is disclosed and includes a first connector portion 62 that is coupled to a second connector portion 64. The first connector portion 62 includes external threads 66 that are of a standard formulation and that are threadingly engaged into interior threads 72 formed on the second fluid connector portion 64.

The second connector portion 64 includes a varying thickness from the forward end of the connector to an aft end. An area having a reduced thickness 78 is disposed between areas having a greater thickness 76 disposed at a forward end 74 and an aft end 75 of the connector portion 64. The internal threads 72 defined within the connector portion 64 include an initial lead-in portion 68 that are of a normal fit that provides for the initial engagement between the first connector portion 62 and the second connector portion 64. The lead-in portion 68 provides a normal fit that can be engaged by hand.

Once the first connector portion 62 is initially engaged into the initial threads 68, a tool is utilized to continue tightening the first connector portion 62 and continue threading into the interference thread portion 70 of the second connector portion 64. Once the first connector portion 62 is fully engaged and threaded into the second connector portion 64, a deforming force 82 is applied to the area of the reduced thickness 78. The forces applied, as is indicated by arrows 82, deforms the areas with the smaller thickness 78 to further maintain and lock the first connector portion 62 within the second connector portion 64.

To facilitate the deformation of a specific area of the second connector portion 64, the thickness is varied axially. An initial thickness is provided at the lead-in threads 68.

This initial thickness indicated at 76 is at the initial end 74. The initial thickness 74 at the leading end on the connector 64 is followed by the area of reduced thickness 78. The area of reduced thickness 78 is followed by an area having a greater thickness 80 that is aft of the reduced thickness 78 and provides for receiving the fluid conduit 54. The reduced thickness 78 includes an outer diameter 86 that is less than the outer diameter 84 of the thicker portions 76 and 80.

During assembly, the first connector portion 62 is initially threaded into the standard thread 68. This threading process can be done by hand as no interference is defined at this interface. A tool is then utilized to continue tightening the first connector portion 62 into the second connector portion 64 and into the interference thread 70. Once the first connector 62 is fully threadingly engaged into the interference thread 70, a deforming force 82 is applied to the area of reduced thickness 78. This deforming force, indicated by arrows 82, introduces an out-of-round condition (FIG. 3b) at the interface between the first connector 62 and the second connector 64 that provides for locking engagement and prevents loosening of the first connector 62 from the second connector 64.

Accordingly, each of the disclosed interference threaded connector fittings provide for the locking of a fluid coupling without the use of additional locking members.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A fluid connection fitting comprising:
a first portion including external threads; and
a second portion receiving the first portion and including internal threads for mating to the external threads, the internal threads include lead threads defining a first thread interface with the external threads for starting attachment of the first portion to the second portion and locking threads defining a second thread interface for locking the first portion to the second portion.

2. The fluid connection fitting as recited in claim 1, wherein the locking threads are non-concentric about a central axis of the second portion and the lead threads are concentric about the central axis.

3. The fluid connection fitting as recited in claim 1, wherein the connector includes a first thickness disposed at the lead threads and a second thickness disposed at the locking threads, with the second thickness less than the first thickness for providing for deformation of an outer diameter proximate to the locking threads.

4. The fluid connector fitting as recited in claim 3, wherein the first thickness corresponds with a first diameter and the second thickness corresponds with a second diameter less than the first diameter.

5. The fluid connector fitting as recited in claim 1, including a relief disposed between the lead threads and the locking threads, wherein the relief does not include threads.

6. The fluid connector fitting as recited in claim 5, wherein the locking threads define an interference fit with the external threads of the first portion.

7. The fluid connector as recited in claim 5, wherein the lead threads and the locking threads include a first inner diameter and the relief comprises a second inner diameter greater than the first diameter.

8. The fluid connector as recited in claim 5, wherein the relief comprises an axial length greater than at least two of the lead threads.

9. A fluid conduit for a gas turbine engine comprising:
a first fluid conduit attachable to a second fluid conduit along an axis; and
a connector for securing the first fluid conduit to the second fluid conduit, the connector including a first portion including external threads; and a second portion receiving the first portion and including internal threads for mating to the external threads, the internal threads include lead threads defining a first thread interface with the external threads for starting attachment of the first portion to the second portion and locking threads defining a second thread interface for locking the first portion to the second portion.

10. The fluid conduit as recited in claim 9, wherein the locking threads are non-concentric about a central axis of the second portion and the lead threads are concentric about the central axis.

11. The fluid conduit fitting as recited in claim 10, wherein the connector includes a first thickness disposed at the lead threads and a second thickness disposed at the locking threads, with the second thickness less than the first thickness for providing for deformation of an outer diameter proximate to the locking threads.

12. The fluid conduit fitting as recited in claim 11, wherein the first thickness corresponds with a first diameter and the second thickness corresponds with a second diameter less than the first diameter.

13. The fluid conduit fitting as recited in claim 9, including a relief disposed between the lead threads and the locking threads, wherein the relief does not include threads.

14. The fluid conduit fitting as recited in claim 13, wherein the locking threads define an interference fit with the external threads of the first portion.

15. The fluid conduit as recited in claim 13, wherein the lead threads and the locking threads include a first inner diameter and the relief comprises a second inner diameter greater than the first diameter.

16. A method of locking a fluid fitting comprising:
defining a first coupling portion including external threads;
defining a second coupling portion receiving the first portion and including internal threads for mating to the external threads, the internal threads include lead threads defining a first thread interface with the external threads for starting attachment of the first portion to the second portion and locking threads defining a second thread interface for locking the first portion to the second portion; and
aligning the first coupling portion with the second coupling portion by engaging the externals threads the lead in threads; and
locking the first coupling portion to the second coupling portion by engaging the external threads with the locking threads of the second coupling portion.

17. The method as recited in claim 16, including generating a locking fit by deforming the locking threads to be non-concentric about a central axis of the second portion and maintaining the lead threads as concentric about the central axis.

18. The method as recited in claim 16, including generating a locking fit by providing the locking threads with an interference fit relative to the external threads.

19. The method as recited in claim 18 including providing a relief disposed between the lead threads and the locking threads with the relief not including threads.

* * * * *

UNITED STATES PATENT AND TRADEMARK OFFICE
CERTIFICATE OF CORRECTION

PATENT NO. : 10,119,635 B2
APPLICATION NO. : 14/200649
DATED : November 6, 2018
INVENTOR(S) : Billie W. Bunting et al.

Page 1 of 1

It is certified that error appears in the above-identified patent and that said Letters Patent is hereby corrected as shown below:

In the Claims

In Claim 16, Column 6, Line 50; replace "externals threads" with --external threads with--

Signed and Sealed this
Fourth Day of January, 2022

Drew Hirshfeld
*Performing the Functions and Duties of the*
*Under Secretary of Commerce for Intellectual Property and*
*Director of the United States Patent and Trademark Office*